US011988683B2

(12) United States Patent
Tsukahara et al.

(10) Patent No.: US 11,988,683 B2
(45) Date of Patent: May 21, 2024

(54) PRETREATMENT DEVICE FOR MALDI

(71) Applicant: SHIMADZU CORPORATION, Kyoto (JP)

(72) Inventors: Mio Tsukahara, Kyoto (JP); Kenta Terashima, Kyoto (JP); Yoshitake Yamamoto, Kyoto (JP); Daisuke Oda, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 447 days.

(21) Appl. No.: 17/017,853

(22) Filed: Sep. 11, 2020

(65) Prior Publication Data
US 2021/0102966 A1 Apr. 8, 2021

(30) Foreign Application Priority Data

Oct. 4, 2019 (JP) .................................. 2019-183756

(51) Int. Cl.
G01N 35/10 (2006.01)
H01J 49/16 (2006.01)

(52) U.S. Cl.
CPC ..... *G01N 35/1002* (2013.01); *G01N 35/1011* (2013.01); *H01J 49/164* (2013.01)

(58) Field of Classification Search
CPC .......... G01N 35/1002; G01N 35/1011; G01N 2001/317; G01N 1/312; H01J 49/164; H01J 49/0418; B05D 1/02; B05B 13/02; B05B 13/04
See application file for complete search history.

(56) References Cited

U.S. PATENT DOCUMENTS 5,770,272 A * 6/1998 Biemann ............. H01J 49/0418
427/427.3
2003/0211756 A1 11/2003 Ito et al.
2019/0270102 A1* 9/2019 Gueller .................. B05B 15/80

FOREIGN PATENT DOCUMENTS

| CH | 615356 A5 * | 1/1980 |
| JP | 2003-224060 A | 8/2003 |
| JP | 2013-77502 A | 4/2013 |
| JP | 2013077502 A * | 4/2013 |
| WO | 2019/106799 A1 | 6/2019 |
| WO | 2019/106800 A1 | 6/2019 |

OTHER PUBLICATIONS

Office Action dated Nov. 8, 2022 in Japanese Application No. 2019-183756.

* cited by examiner

*Primary Examiner* — Jill A Warden
*Assistant Examiner* — John McGuirk
(74) *Attorney, Agent, or Firm* — Sughrue Mion, PLLC

(57) ABSTRACT

A moving mechanism and a spray mechanism are controlled to spray a reagent from a nozzle to a sample plate while relatively moving the sample plate and the nozzle. The reagent is applied to an entire application area by moving a spray spot of the reagent sprayed from the nozzle, on the sample plate from a start point to an end point. At this time, the spray spot is moved in a sample placement area after a spray amount of the reagent from the nozzle and a moving speed of the spray spot become constant.

3 Claims, 2 Drawing Sheets

PRETREATMENT DEVICE FOR MALDI

CROSS REFERENCE TO RELATED APPLICATION

This application claims priority to Japanese Patent Application No. 2019-183756 filed on Oct. 4, 2019, the entire disclosure of which is incorporated by reference herein.

BACKGROUND OF THE INVENTION

Field of the Invention

The present invention relates to a pretreatment device for MALDI.

Description of the Related Art

Matrix assisted laser desorption/ionization (MALDI) is known as an example of a method of ionizing a sample. When performing analysis using MALDI, as a pretreatment for the sample, a matrix substance that easily absorbs laser light and is easily ionized is premixed with the sample.

In a general pretreatment, a solution containing a matrix substance (matrix solution) is added as a reagent to a sample, and a measurement target substance contained in the sample is taken into the matrix solution. Then, a solvent in the matrix solution is vaporized by drying, and crystal grains containing the measurement target substance are formed. By irradiating the crystal grains with laser light, the measurement target substance can be ionized by the interaction among the measurement target substance, the matrix substance, and the laser light.

As a method of adding a reagent such as a matrix solution to a sample, a spray method capable of forming fine crystals is known. In the spray methods disclosed in WO2019/106799 and WO2019/106800, a liquid level of the matrix solution in a container is pressurized by introducing an inert gas into the container in which the matrix solution is housed. As a result, the matrix solution is drawn out from a pipe communicating with the inside of the container, and the matrix solution is sprayed from a nozzle through a resistance pipe.

The matrix solution is sprayed toward a sample plate on which the sample is placed. The sample is placed in a sample placement area on the sample plate. The sample plate is installed on a stage, and the matrix solution can be applied to the entire application area including the sample placement area on the sample plate by moving the stage while spraying the matrix solution.

SUMMARY OF THE INVENTION

A spray spot on the sample plate of the matrix solution sprayed from the nozzle is moved on the sample plate as the movement of the stage. However, immediately after the start of movement of the stage, since the moving speed of the spray spot is gradually increased, it takes time to reach a constant speed. Therefore, the film thickness of the matrix solution applied to the sample placement area on the sample plate may become uneven until the spray spot is moved at a constant speed.

Therefore, it is possible to move the stage using a high-performance motor so that the stage reaches a constant speed in a short time immediately after the start of movement of the stage. However, since the manufacturing cost becomes high when the high-performance motor is adopted, there has been a demand for a configuration in which a reagent such as a matrix solution can be applied to the sample placement area with a uniform film thickness by using a motor in the related art.

The invention has been made in view of the above circumstances, and an object of the invention is to provide a pretreatment device for MALDI that can apply a reagent to a sample placement area on a sample plate with a uniform film thickness.

A first aspect of the invention is a pretreatment device for MALDI which applies a reagent to an application area including a sample placement area by spraying the reagent from a nozzle to a sample placed in the sample placement area on a sample plate, and includes a moving mechanism, a spray mechanism, and a control unit. The moving mechanism moves at least one of the sample plate and the nozzle. The spray mechanism sprays the reagent from the nozzle. The control unit controls the moving mechanism and the spray mechanism to spray the reagent from the nozzle to the sample plate while relatively moving the sample plate and the nozzle. The control unit applies the reagent to the entire application area by moving a spray spot of the reagent sprayed from the nozzle, on the sample plate from a start point to an end point, and moves the spray spot in the sample placement area after a spray amount of the reagent from the nozzle and a moving speed of the spray spot become constant.

According to the first aspect of the invention, the spray spot is not moved in the sample placement area until the spray amount of the reagent sprayed from the nozzle and the moving speed of the spray spot become constant, and the spray spot is moved in the sample placement area after the spray amount of the reagent and the moving speed of the spray spot become constant. Accordingly, since the spray spot is always moved in the sample placement area at a constant moving speed with a constant spray amount, the reagent can be applied to the sample placement area with a uniform film thickness.

DETAILED DESCRIPTION OF THE PREFERRED EMBODIMENTS

1. Overall Configuration of Pretreatment Device for MALDI

Figure 1:
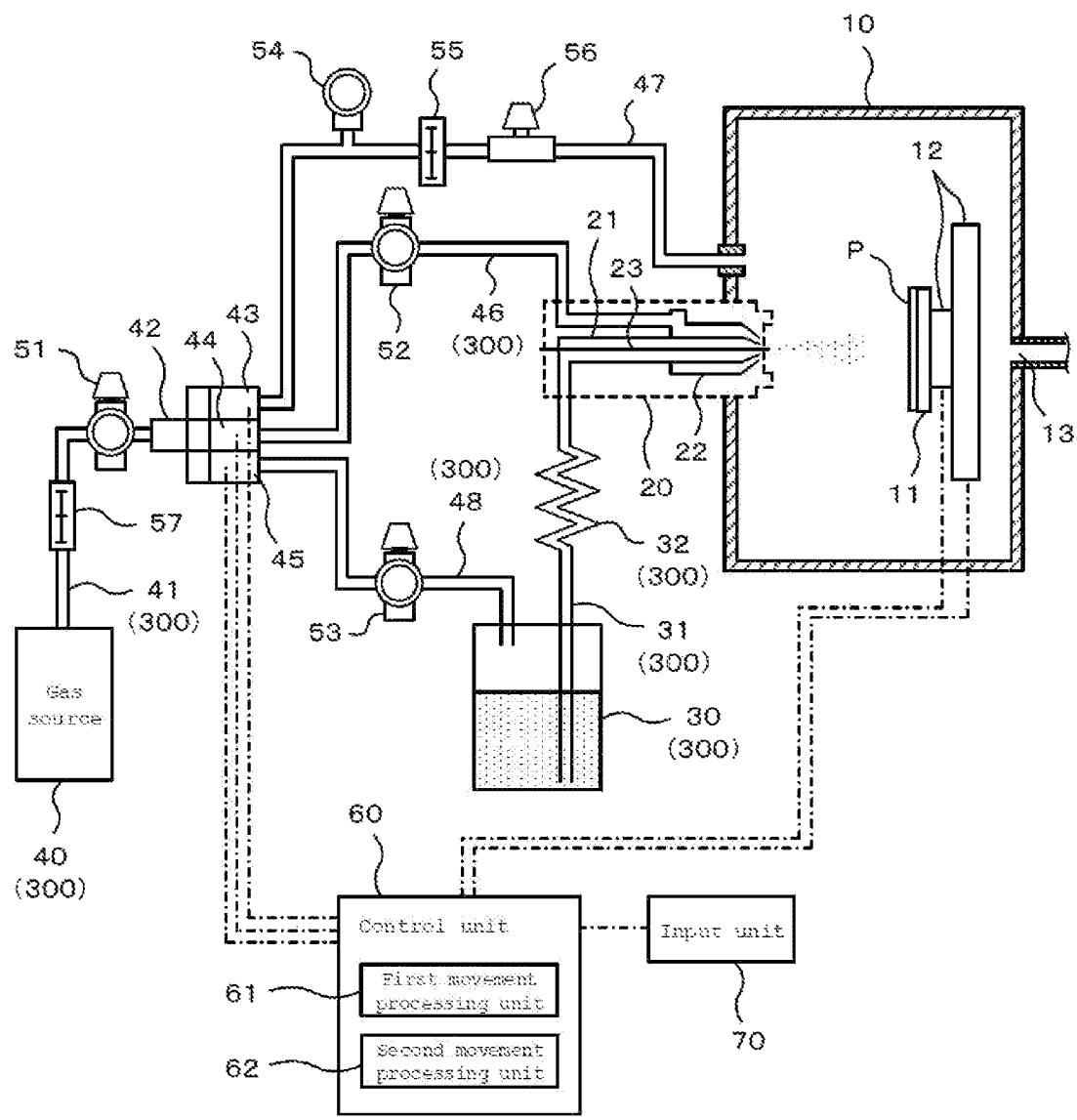
FIG. 1 is a schematic diagram illustrating an embodiment of a pretreatment device for MALDI.

FIG. 1 is a schematic diagram illustrating an embodiment of a pretreatment device for MALDI. The pretreatment device for MALDI is a device for performing a pretreatment using a reagent for MALDI. In the embodiment, a configuration will be described in which a solution containing a matrix substance (matrix solution) is used as an example of the reagent for MALDI and the matrix solution is sprayed toward a sample plate P by a spray method. However, the reagent for MALDI is not limited to the matrix solution, and may be another reagent such as a derivatization reagent or an enzyme digestion reagent.

A sample (not illustrated) such as a biological tissue section is placed on the sample plate P. The sample plate P on which the sample is placed is installed in a hollow chamber 10, and the matrix solution sprayed from a nozzle 20 into the chamber 10 is applied onto the sample plate P in the chamber 10. The nozzle 20 faces the sample plate P, and sprays the matrix solution in a direction orthogonal to the sample plate P.

Inside the chamber 10, a stage 11 to which the sample plate P can be attached and detached is provided. The stage 11 can be moved by a moving mechanism 12. The moving mechanism 12 includes, for example, a motor (not illustrated), and can move the stage 11 by driving the motor.

The moving mechanism 12 can move the sample plate P in two directions (X direction and Y direction) orthogonal to each other in a plane parallel to the sample plate P. Therefore, by moving the sample plate P in the X direction and the Y direction by using the moving mechanism 12 while spraying the matrix solution from the fixed nozzle 20, a spot (spray spot) on the sample plate P onto which the matrix solution is sprayed can be moved. However, the moving mechanism 12 is not limited to the configuration of moving the sample plate P, and may have a configuration of moving the nozzle 20 in parallel to the sample plate P, or a configuration of moving both the sample plate P and the nozzle 20.

An exhaust port 13 is formed on a wall surface of the chamber 10. The exhaust port 13 communicates with a draft chamber (not illustrated) so that the gas in the chamber 10 is exhausted to the draft chamber.

The nozzle 20 includes a liquid feed pipe 21 and a gas pipe 22. The liquid feed pipe 21 is for ejecting the matrix solution into the chamber 10, and the inner diameter of a tip end portion is small, for example, about 0.4 mm. The gas pipe 22 is for ejecting gas into the chamber 10, and has a larger diameter than that of the liquid feed pipe 21. The gas pipe 22 is disposed coaxially with the liquid feed pipe 21 so as to surround the outside of the liquid feed pipe 21. As a result, a gas flow path is formed between an inner peripheral surface of the gas pipe 22 and an outer peripheral surface of the liquid feed pipe 21.

The tip end positions of the liquid feed pipe 21 and the gas pipe 22 are substantially coincident with each other in an axial direction. A needle 23 is provided in the liquid feed pipe 21 along its axis. The tip end of the needle 23 protrudes from the tip end of the liquid feed pipe 21. The matrix solution fed in the liquid feed pipe 21 is guided along the needle 23, and is ejected from the tip end of the needle 23 into the chamber 10. At this time, the matrix solution is diffused by the gas ejected from the gas pipe 22 so that the atomized matrix solution is sprayed into the chamber 10.

The liquid feed pipe 21 communicates with a reagent storage section 30 via a pipe 31. The reagent storage section 30 is for housing a reagent, and houses the matrix solution in the embodiment. One end of the pipe 31 is disposed at a position lower than the liquid level of the matrix solution inside the reagent storage section 30.

The matrix solution in the reagent storage section 30 is guided to the nozzle 20 via the pipe 31, and is sprayed from the liquid feed pipe 21 of the nozzle 20 into the chamber 10. A resistance pipe 32 is provided in the middle of the pipe 31. The inner diameter of the resistance pipe 32 is smaller than the inner diameter of the pipe 31, and is, for example, about 0.013 mm. Therefore, the matrix solution fed from the inside of the reagent storage section 30 to the pipe 31 is stably supplied to the nozzle 20 at an appropriate flow rate by receiving resistance in the resistance pipe 32. However, the resistance pipe 32 is not limited to a configuration having a diameter smaller than that of the pipe 31, and another configuration capable of providing resistance to the matrix solution such as a configuration in which a resistor is provided inside may be adopted.

The gas pipe 22 communicates with a gas source 40 via pipes 41 and 46. The gas source 40 includes, for example, a gas cylinder or a gas generator, and delivers a gas having a pressure higher than atmospheric pressure to the pipe 41. The gas delivered from the gas source 40 is, for example, an inert gas such as nitrogen gas. The pipe 41 communicates with the pipe 46 via a manifold 42 and a switching valve 44. The manifold 42 is a multi-branch pipe for branching the gas delivered from the gas source 40 to the pipe 41 into a plurality of (three in this example) branch paths, and the switching valve 44 is provided in one of the branch paths. The supply and stop of gas from the pipe 41 to the pipe 46 can be switched by the switching valve 44.

The pipe 41 is provided with an adjustment valve 51 and a flow meter 57. By adjusting opening degree of the adjustment valve 51 based on the flow rate of the gas in the pipe 41 detected by the flow meter 57, the gas can be delivered from the gas source 40 to the pipe 41 at a desired flow rate. The pipe 46 is provided with an adjustment valve 52, and the flow rate of the gas supplied to the nozzle 20 can be adjusted by adjusting the opening degree of the adjustment valve 52.

In addition to the switching valve 44, switching valves 43 and 45 are provided in the respective branch paths branched by the manifold 42. A pipe 47 communicates with the switching valve 43, and a pipe 48 communicates with the switching valve 45. The supply and stop of gas from the pipe 41 to the pipe 47 can be switched by the switching valve 43. Further, the supply and stop of gas from the pipe 41 to the pipe 48 can be switched by the switching valve 45.

The pipe 47 communicates with the inside of the chamber 10. By supplying gas into the chamber 10 via the pipes 41 and 47 before spraying the matrix solution from the nozzle 20, the air in the chamber 10 can be replaced with the gas from the gas source 40. The pipe 47 is provided with a pressure gauge 54, a flow meter 55, an adjustment valve 56, and the like. By adjusting the opening degree of the adjustment valve 56 based on the pressure of the gas in the pipe 47 detected by the pressure gauge 54 and the flow rate of the gas in the pipe 47 detected by the flow meter 55, the gas can be supplied to the chamber 10 at the desired pressure and flow rate.

The pipe 48 communicates with the reagent storage section 30. Specifically, one end of the pipe 48 is located inside the reagent storage section 30 and is located at a position higher than the liquid level of the matrix solution. Gas is supplied into the reagent storage section 30 via the pipes 41 and 48 to pressurize a space above the liquid level of the matrix solution, so that the matrix solution is drawn out from the pressurized inside of the reagent storage section 30 to the pipe 31. The pipe 48 is provided with an adjustment valve 53, and the flow rate of the gas to be supplied to the reagent storage section 30 can be adjusted by adjusting the opening degree of the adjustment valve 53.

Each unit such as the moving mechanism 12 and the switching valves 43, 44, and 45 is electrically connected to a control unit 60. The control unit 60 includes, for example, a central processing unit (CPU), and the CPU executes a computer program to control the operation of each unit. An input unit 70 including, for example, a keyboard or a mouse is electrically connected to the control unit 60. A user can input various settings by operating the input unit 70.

The reagent storage section 30, the pipe 31, the resistance pipe 32, the gas source 40, the pipes 41, 46 and 48, the switching valves 44 and 45, and the like constitute a spray mechanism 300 for spraying the matrix solution from the nozzle 20. The control unit 60 controls the moving mechanism 12 and the spray mechanism 300 to spray the matrix solution from the nozzle 20 to the sample plate P while relatively moving the sample plate P and the nozzle 20.

The control unit 60 functions as a first movement processing unit 61 and a second movement processing unit 62 by the CPU executing the computer program. The first movement processing unit 61 moves the sample plate P on a straight line. As a result, the sample plate P and the nozzle 20 are relatively moved along a first direction (X direction). The second movement processing unit 62 moves the sample plate P on a straight line in a direction different from that of the first movement processing unit 61. As a result, the sample plate P and the nozzle 20 are relatively moved along a second direction (Y direction) intersecting (for example, orthogonal to) the first direction.

2. Reagent Spraying Method

Figure 2:
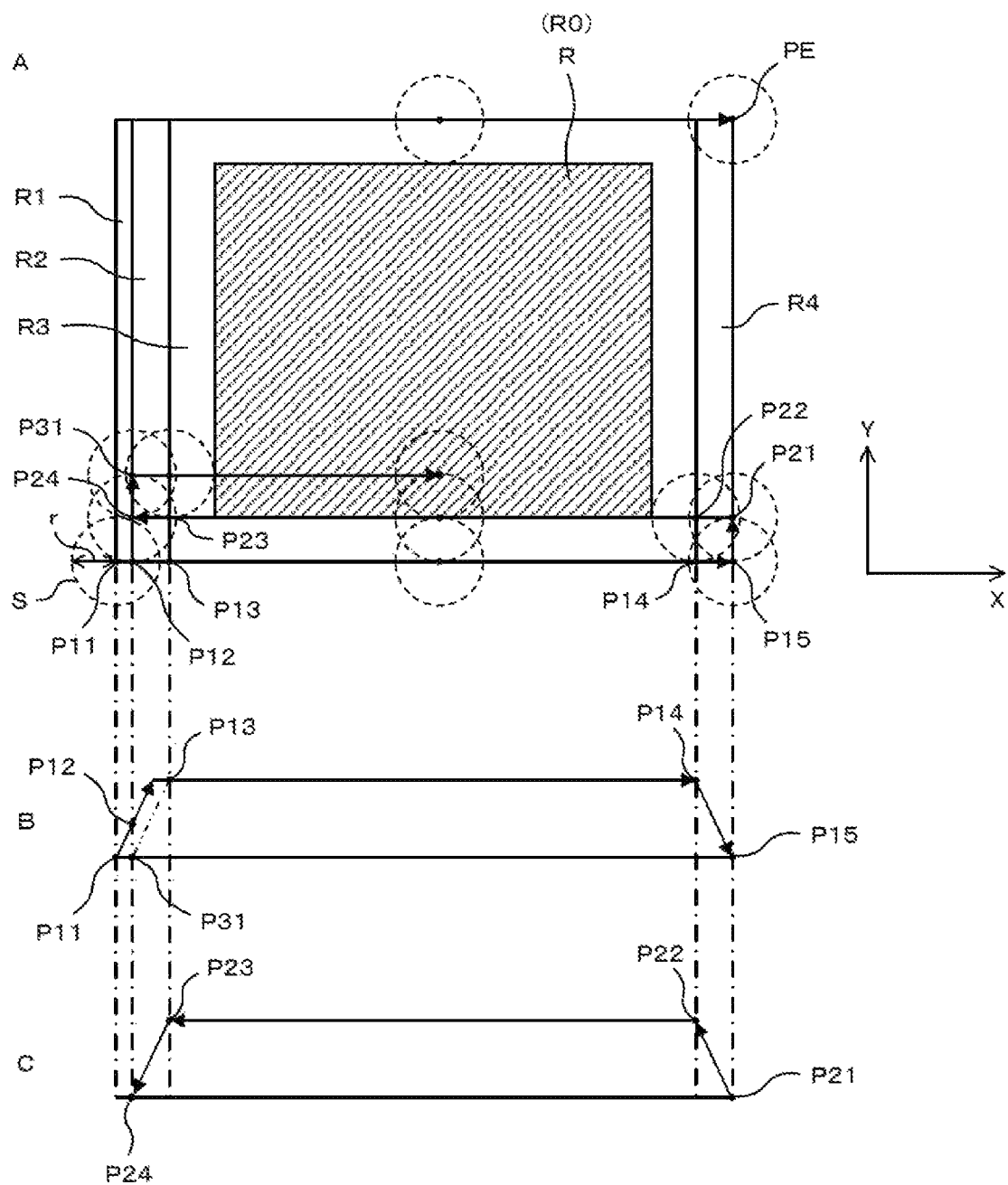
FIG. 2 is a diagram for describing an example of a reagent spraying method.

FIG. 2 is a diagram for describing an example of a reagent spraying method. FIG. 2A is a plan view illustrating an area where a spray spot S is moved. The matrix solution as the reagent is applied by being sprayed to an application area R which is a surface of the sample plate P on the nozzle 20 side. In this example, the entire surface of the sample plate P is the application area R, but the invention is not limited to this, and only a part of the surface of the sample plate P may be the application area R.

An area on the sample plate P where the sample is placed (sample placement area R0) may be the entire application area R or a part of the application area R. It is sufficient that the matrix solution is applied to at least the sample placement area R0, but in the embodiment, a case where the matrix solution is applied to the application area R including the sample placement area R0 will be described.

In a case of applying the matrix solution to the application area R, first, the spraying of the matrix solution is started at a start point P11 which is separated from the application area R. As indicated by the broken line in FIG. 2, the matrix solution sprayed from the nozzle 20 is applied as a circular spray spot S having a predetermined radius r on the stage 11 on which the sample plate P is installed. The radius r of the spray spot S is, for example, 15 mm, but is not limited to this.

The spray spot S is moved such that its center is moved alternately in the X direction and the Y direction from the start point P11, and the spray spot S uniformly passes through the entire application area R in the process of movement to an end point PE, so that the matrix solution is applied to the entire application area R. The spraying of the matrix solution from the nozzle 20 is continuously performed from the start point P11 to the end point PE. In the embodiment, a reciprocating movement is repeated in which the spray spot S is moved from the start point P11 in one direction along the X direction, then is shifted in the Y direction by a predetermined amount, and then is moved in an opposite direction along the X direction. In the following description, the position of the spray spot S means the center position of the spray spot S.

The spray spot S of which the movement in the X direction from the start point P11 is started sequentially passes through a spray stabilization area R1, an acceleration and deceleration area R2, a margin area R3, and an acceleration and deceleration area R4. The spray stabilization area R1 is an area for providing a waiting time from the start of spraying of the matrix solution from the nozzle 20 to the stabilization of a spraying state. The stabilization of the spraying state means that the spray amount from the nozzle 20 becomes constant, and for example, variation of the spray amount may be allowed within a range of ±5% with respect to a target value. The width of the spray stabilization area R1 in the X direction is, for example, 5 mm, but is not limited to this.

The acceleration and deceleration areas R2 and R4 are areas for providing a waiting time when the moving mechanism 12 accelerates or decelerates the stage 11. In a case of accelerating the stage 11, the moving speed of the spray spot S reaches a constant speed while the position of the spray spot S is in the acceleration and deceleration areas R2 and R4. On the other hand, in a case of decelerating the stage 11, the spray spot S moving at a constant speed is stopped while the position of the spray spot S is in the acceleration and deceleration areas R2 and R4. The above-mentioned constant speed is, for example, 250 mm/sec, and variation of the speed may be allowed within a range of ±5% with respect to a target value. The width of the acceleration and deceleration areas R2 and R4 in the X direction is, for example, 12.5 mm, but is not limited to this.

The margin area R3 is an area set on the outer periphery of the application area R, and is set to have a width in accordance with the radius r of the spray spot S, for example. The margin area R3 in the embodiment is a rectangular area set to have a constant width along the outer periphery of the application area R, and the width matches the radius r of the spray spot S. However, the invention is not limited to such a configuration, and the width may be smaller or larger than the radius r of the spray spot S. Further, the width is not limited to be constant, and the width may be partially changed.

FIG. 2B illustrates a change in moving speed of the spray spot S when the spray spot S is moved in one direction along the X direction. Further, FIG. 2C illustrates a change in moving speed of the spray spot S when the spray spot S is moved in an opposite direction along the X direction. In each of FIG. 2B and FIG. 2C, the positional relationship with FIG. 2A is illustrated in an association manner.

The moving speed of the spray spot S of which the movement in the X direction from the start point P11 is started is gradually increased as indicated by the solid line in FIG. 2B. Then, at a point P12 where the position of the spray spot S enters the acceleration and deceleration area R2, the spraying state for the spray spot S is stabilized, and the moving speed of the spray spot S reaches a constant speed while passing through the acceleration and deceleration area R2. After that, the moving speed of the spray spot S is maintained at the constant speed from a point P13 where the position of the spray spot S enters the margin area R3 to a point P14 where the position of the spray spot S enters the acceleration and deceleration area R4. When the position of the spray spot S enters the acceleration and deceleration area R4, the moving speed of the spray spot S is gradually decreased, and the movement along the X direction is stopped at a point P15 where the acceleration and deceleration area R4 ends.

In this way, when the position of the spray spot S is moved from the start point P11 to the point P15 along the X direction, the spray spot S is moved outside the application area R as illustrated in FIG. 2A. That is, since the width of the margin area R3 matches the radius r of the spray spot S, when the spray spot S passes through the margin area R3 from the point P13 to the point P14, the spray spot S does not pass through the application area R. At this time, the spray spot S also does not pass through the sample placement area R0 included in the application area R. However, in a case where the sample placement area R0 is smaller than the application area R, when the spray spot S passes through the margin area R3 from the point P13 to the point P14, the spray spot S may pass through a part of the application area R within a range where the spray spot S does not pass through the sample placement area R0.

After that, the position of the spray spot S is moved from the point P15 to a point P21 in the Y direction, and then moved again in the opposite direction along the X direction. At this time, the moving speed of the spray spot S of which the movement from the start point P21 in the opposite direction along the X direction is started is gradually increased as indicated by the solid line in FIG. 2C. Then, the moving speed of the spray spot S reaches a constant speed while the position of the spray spot S passes through the acceleration and deceleration area R4. After that, the moving speed of the spray spot S is maintained at the constant speed from a point P22 where the position of the spray spot S enters the margin area R3 to a point P23 where the position of the spray spot S enters the acceleration and deceleration area R2. When the position of the spray spot S enters the acceleration and deceleration area R2, the moving speed of the spray spot S is gradually decreased, and the movement along the X direction is stopped at a point P24 where the acceleration and deceleration area R2 ends.

When the position of the spray spot S is moved from the point P22 to the point P23 along the X direction, the spray spot S moves in the application area R. Since the width of the margin area R3 matches the radius r of the spray spot S, as illustrated in FIG. 2A, when the position of the spray spot S enters the margin area R3 from the point P22, the spray spot S enters the application area R from the peripheral portion at a constant speed. As a result, the spray spot S is moved in the application area R after both the spray amount of the matrix solution from the nozzle 20 and the moving speed of the spray spot S become constant. At this time, the spray spot S is moved in the sample placement area R0, so that the matrix solution is applied to the sample placed in the sample placement area R.

After that, the position of the spray spot S is moved from the point P24 to a point P31 in the Y direction, and then moved again along the X direction. When the spray spot S is moved in the Y direction, the spray spot S is moved outside the application area R as illustrated in FIG. 2A. That is, since the width of the margin area R3 matches the radius r of the spray spot S, when the spray spot S is moved in the Y direction, the spray spot S does not pass through the application area R. At this time, the spray spot S also does not pass through the sample placement area R0 included in the application area R. However, in a case where the sample placement area R0 is smaller than the application area R, when the spray spot S is moved in the Y direction, the spray spot S may pass through a part of the application area R within a range where the spray spot S does not pass through the sample placement area R0.

The moving speed of the spray spot S of which the movement from the start point P31 along the X direction is started is gradually increased as indicated by the two-dot chain line in FIG. 2B. Then, the moving speed of the spray spot S reaches a constant speed while the position of the spray spot S passes through the acceleration and deceleration area R2. After that, the change in moving speed of the spray spot S after the position of the spray spot S enters the margin area R3 is the same as the change in moving speed of the spray spot S from the point P13 to the point P15 described above.

After that, in the same manner, the movement of the spray spot S is executed alternately in the X direction and the Y direction, and the spray spot S is moved to the end point PE.

At the time of the final movement of the spray spot S in the X direction to reach the end point PE, the spray spot S is moved outside the application area R, as in the first movement in the X direction. At this time, the spray spot S does not pass through the sample placement area R0 included in the application area R. However, in a case where the sample placement area R0 is smaller than the application area R, the spray spot S may pass through a part of the application area R within a range where the spray spot S does not pass through the sample placement area R0.

3. Modification

In the above embodiment, the configuration has been described in which the movement of the spray spot S is started at the same time as the spraying of the matrix solution from the nozzle 20 is started. However, the invention is not limited to such a configuration, and for example, the spray stabilization area R1 may be omitted, and the point P12 where the acceleration and deceleration area R2 starts may be the start point of the movement of the spray spot S. In this case, the spraying of the matrix solution from the nozzle 20 may be started at the start point P12, and the movement of the spray spot S from the start point P12 may be started after the spraying state for the spray spot S is stabilized.

The movement amount of the spray spot S in the Y direction is not limited to the same movement amount as the radius r of the spray spot S, and may be a movement amount larger than the radius r of the spray spot S, or a movement amount smaller than the radius r of the spray spot S. The movement of the spray spot S in the Y direction may be the same movement amount as a diameter 2r of the spray spot S, for example.

The invention is not limited to the configuration in which the spray spot S passes through the application area R when the spray spot S is moved along the X direction, and a configuration may be adopted in which the spray spot S passes through the application area R when the spray spot S is moved along the Y direction. That is, the movement of the spray spot S along the X direction in FIG. 2A may be the movement along the Y direction, and the movement of the spray spot S along the Y direction in FIG. 2A may be the movement along the X direction.

4. Aspects

It will be appreciated by those of skill in the art that the exemplary embodiments described above are specific examples of the following aspects.

(Aspect 1) A pretreatment device for MALDI according to an aspect is a pretreatment device for MALDI which applies a reagent to an application area including a sample placement area by spraying the reagent from a nozzle to a sample placed in the sample placement area on a sample plate, the pretreatment device for MALDI may include a moving mechanism that moves at least one of the sample plate and the nozzle;

a spray mechanism that sprays the reagent from the nozzle; and a control unit that controls the moving mechanism and the spray mechanism to spray the reagent from the nozzle to the sample plate while relatively moving the sample plate and the nozzle, and the control unit may apply the reagent to the entire application area by moving a spray spot of the reagent sprayed from the nozzle, on the sample plate from a start point to an end point, and may move the spray spot in the sample placement area after a spray amount of the reagent from the nozzle and a moving speed of the spray spot become constant.

According to the pretreatment device for MALDI described in Aspect 1, the spray spot is not moved in the sample placement area until the spray amount of the reagent sprayed from the nozzle and the moving speed of the spray spot become constant, and the spray spot is moved in the sample placement area after the spray amount of the reagent and the moving speed of the spray spot become constant. Accordingly, since the spray spot is always moved in the sample placement area at a constant moving speed with a constant spray amount, the reagent can be applied to the sample placement area with a uniform film thickness.

(Aspect 2) In the pretreatment device for MALDI described in Aspect 1, the control unit may include a first movement processing unit that relatively moves the sample plate and the nozzle along a first direction, and a second movement processing unit that relatively moves the sample plate and the nozzle along a second direction intersecting the first direction, and the control unit may move the spray spot from the start point to the end point by executing the relative movement of the sample plate and the nozzle alternately in the first direction and the second direction.

According to the pretreatment device for MALDI described in Aspect 2, the spray spot is moved from the start point to the end point by executing the relative movement of the sample plate and the nozzle alternately in the first direction and the second direction, and thereby the reagent can be applied to the sample placement area with a uniform film thickness.

(Aspect 3) In the pretreatment device for MALDI described in Aspect 2, the spray spot may be moved outside the sample placement area when the spray spot is moved from the start point along the first direction, and then the spray spot may be moved in the sample placement area when the spray spot is moved again along the first direction after being moved in the second direction.

According to the pretreatment device for MALDI described in Aspect 3, since the spray spot is not moved in the sample placement area when the spray spot is moved from the start point along the first direction, the reagent can be applied to the sample placement area with a more uniform film thickness in consideration of the diameter of the spray spot.

(Aspect 4) In the pretreatment device for MALDI described in Aspect 2 or Aspect 3, the spray spot may be moved outside the sample placement area when the spray spot is moved along the second direction.

According to the pretreatment device for MALDI described in Aspect 4, since the spray spot is not moved in the sample placement area when the spray spot is moved along the second direction, the reagent can be applied to the sample placement area with a more uniform film thickness in consideration of the diameter of the spray spot.

What is claimed is:

1. A pretreatment device for MALDI which applies a reagent to an application area including a sample placement area by spraying the reagent from a nozzle to a sample placed in the sample placement area on a sample plate, comprising:

the sample, wherein the sample placement area is the area where the sample is located;

a moving mechanism that moves at least one of the sample plate and the nozzle;

a spray mechanism that sprays the reagent from the nozzle; and a control unit that is configured to control the moving mechanism and the spray mechanism to spray the reagent from the nozzle to the sample plate while relatively moving the sample plate and the nozzle, wherein the control unit is configured to apply the reagent to the entire application area by moving a spray spot of the reagent sprayed from the nozzle, on the sample plate from a start point to an end point, and is configured to move the spray spot in the sample placement area after a spray amount of the reagent from the nozzle flows at a constant rate and a moving speed of the spray spot become constant;

wherein the control unit includes a first movement processing unit that relatively moves the sample plate and the nozzle along a first direction, and a second movement processing unit that relatively moves the sample plate and the nozzle along a second direction intersecting the first direction, and the control unit is configured to move the spray spot from the start point to the end point by executing the relative movement of the sample plate and the nozzle alternately in the first direction and the second direction; and wherein during an entire first instance of a first movement of the spray spot along the first direction from the start point until the spray spot is moved in the second direction, the spray spot is moved outside the sample placement area on which the sample is located, and then the spray spot is moved within the sample placement area when the spray spot is moved again along the first direction after being moved in the second direction.

2. The pretreatment device for MALDI according to claim 1, wherein the spray spot is moved outside the sample placement area when the spray spot is moved along the second direction.

3. The pretreatment device for MALDI according to claim 1, wherein the reagent applied to the application area is a matrix solution that assists in an ionization process of a sample.

* * * * *